Patented Mar. 17, 1931

1,797,188

UNITED STATES PATENT OFFICE

HERMAN A. BRUSON, OF AKRON, OHIO, ASSIGNOR TO THE GOODYEAR TIRE & RUBBER COMPANY, OF AKRON, OHIO, A CORPORATION OF OHIO

RUBBER CONVERSION PRODUCT AND METHOD OF PRODUCING SAME

No Drawing.  Application filed February 18, 1928. Serial No. 255,505.

My invention relates to methods of treating rubber and it has particular relation to methods for treating that substance whereby new and useful reaction products are formed.

The invention has for one of its objects the provision of a relatively hard balata-like reaction product of rubber adapted to serve as a lacquer or varnish.

Another object of the invention is to provide a balata-like reaction product of rubber which may be so softened by the application of heat that it may be worked upon a mill and molded to produce objects of practical value.

It has heretofore been observed that rubber will react with sulphuric acid or with the halide salts of amphoteric metals to form products which normally are relatively hard and inelastic when cold. These products may be softened by the application of heat and are thus prepared to be worked upon a mill.

This invention consists in the discovery that reaction products similar to those of rubber and sulfuric acid or halide salts may be obtained by the action of halogenated acids of tin upon rubber.

In accordance with one form of the invention, ten percent by weight of hydrated chlorostannic acid ($H_2SnCl_6.2H_2O$) is dispersed in solid rubber by milling the two together upon ordinary mill rollers. The product thus obtained is subjected to a temperature of 130° to 150° C. for a period of two to five hours. A reaction product is thus obtained whose characteristics depend upon the length of the period of heating. A relatively short period of heat treatment, or low reaction temperatures results in a tough balata-like product; whereas, a relatively long period of treatment or excessive temperatures results in an exceedingly hard ebonite-like substance. Ebonite-like products may, also, be obtained by increasing the quantity of acid employed.

Either of these materials becomes plastic upon the application of heat and may be sheeted out and mixed with softeners upon a hot mill. The materials thus produced are soluble in benzene and other rubber solvents. Such solutions deposit a tough, flexible, relatively waterproof film when allowed to evaporate upon a surface painted with them and are therefore suitable for uses as lacquers or varnishes in certain cases. The solid products themselves may readily be molded under the influence of heat and pressure to form useful products resembling hard rubber.

Chemically, these products contain a certain proportion of bound chlorine which varies in amount, depending upon the temperature and the concentration of halogenated stannic acid used. They are, therefore, not isomeric with rubber hydrocarbon but represent a halogenated mixture of polymers and degradation products of rubber.

The reaction may also be effected by the addition of hydrated chlorostannic acid to a benzene solution of rubber, thereby avoiding the necessity of working the rubber, in order to disperse the chlorostannic acid. In order to accelerate the reaction the solution should be heated to the boiling point of the benzene.

Results similar to those described above may be obtained by the employment of hydrated chlorostannous acid ($HSnCl_3.3H_2O$), instead of chlorostannic acid. The reaction product so obtained has a relatively light grey color, rather than a brown or dark brown color, such as that obtained by the interaction of rubber with chlorostannic acid. Instead of the chloro derivatives of the stanno acids, the bromine derivatives may be employed, namely bromo stannic or bromo stannous acids.

It will be apparent from the preceding description that the invention involves a relatively simple method whereby balata-like or ebonite-like materials may be readily obtained from ordinary rubber. These products may be formed by the employment of relatively inexpensive ingredients.

Although I have described in detail only the preferred forms of the invention, it will be apparent to those skilled in the art that it is not so limited, but that various minor modifications may be made therein without departing from the spirit of the invention or from the scope of the appended claims.

What I claim is:

1. A method of treating rubber which comprises heating it in the presence of an acid, the negative radical of which consists of tin and chlorine.

2. A method of treating rubber which comprises heating it in the presence of chlorostannic acid.

3. A method of treating rubber which comprises milling an acid in which the negative radical comprises tin and chlorine into rubber in the solid state and subsequently heating the compound formed.

4. A method of treating rubber which comprises milling chlorostannic acid into rubber while the latter is in the solid state and subsequently heating the compound formed.

5. A method of treating rubber which comprises milling chlorostannic acid into solid rubber, heating the compound to form a reaction product and later homogenizing the reaction product by working it upon a hot mill.

6. A reaction product of rubber with an acid, the negative portion of which comprises tin and chlorine.

7. A reaction product of rubber with a chlorostannic acid.

8. A reaction product formed by milling chlorostannic acid into rubber and subsequently heating the compound formed.

9. A method of treating rubber which comprises causing it to react with a hydrated halogen acid of tin.

10. A reaction product of rubber and a hydrated halogen acid of tin.

11. A method of treating rubber which comprises heating it in the presence of a chlorostannous acid.

12. A method of treating rubber which comprises adding chlorostannic acid to dissolved rubber and heating the solution for a period of two hours or more.

13. A reaction product of rubber with chlorostannous acid.

In witness whereof, I have hereunto signed my name.

Signed at Akron, in the county of Summit and State of Ohio, U. S. A., this 17th day of February, 1928.

HERMAN A. BRUSON.